United States Patent [19]
Martinez

[11] Patent Number: 6,047,573
[45] Date of Patent: Apr. 11, 2000

[54] TELEPHONE LOCK BOX

[76] Inventor: David Martinez, 225 Shay Ave., La Puente, Calif. 91744

[21] Appl. No.: 09/204,477

[22] Filed: Dec. 3, 1998

[51] Int. Cl.[7] .................................................. E05B 73/00
[52] U.S. Cl. .................................... 70/58; 70/63; 70/159; 70/164; 70/DIG. 72; 220/367.1; 312/213; 312/223.4; 312/223.6; 379/445; 379/447
[58] Field of Search .............................. 70/159, DIG. 72, 70/14, 57, 58, 63, 158, 160–173; 220/367.1, 370, 372, 845; 379/445, 447; 312/210, 213, 223.4, 223.6

[56] References Cited

U.S. PATENT DOCUMENTS

| | | | |
|---|---|---|---|
| 246,503 | 8/1881 | Haslett | 70/159 |
| 381,824 | 4/1888 | Bowersock | 312/213 |
| 669,171 | 3/1901 | Jefferis | 312/213 |
| 862,595 | 8/1907 | Thornley | 312/213 |
| 868,234 | 10/1907 | Tyden | 292/205 X |
| 887,168 | 5/1908 | Will | 312/213 |
| 931,669 | 8/1909 | Babcock | 312/213 |
| 1,152,644 | 9/1915 | King | 312/213 |
| 1,203,380 | 10/1916 | Martin | 312/213 X |
| 1,385,575 | 7/1921 | Nowack | 220/845 |
| 1,473,001 | 11/1923 | White | 70/159 |
| 1,806,518 | 5/1931 | Brylka | 70/159 |
| 2,280,542 | 4/1942 | Rosendale | 312/213 X |
| 2,716,882 | 9/1955 | Gill et al. | 70/159 |
| 2,743,035 | 4/1956 | Fogarty | 220/367.1 X |
| 3,185,535 | 5/1965 | Williams | 312/223.4 |
| 3,190,708 | 6/1965 | Trimnal | 312/213 |
| 3,926,487 | 12/1975 | Reyes | 312/213 X |
| 4,204,097 | 5/1980 | Schmit | 379/445 |
| 4,297,539 | 10/1981 | Fairbanks | 379/445 |
| 4,411,482 | 10/1983 | Hoff | 379/447 X |
| 4,750,204 | 6/1988 | Bartley et al. | 70/DIG. 72 X |
| 4,993,244 | 2/1991 | Osman | 70/30 |

FOREIGN PATENT DOCUMENTS

| | | | |
|---|---|---|---|
| 24382 | 1/1931 | Australia | 312/213 |
| 1012863 | 7/1952 | France | 312/213 |
| 2182824 | 5/1987 | United Kingdom | 379/445 |
| 2184917 | 7/1987 | United Kingdom | 379/445 |
| 2220323 | 1/1990 | United Kingdom | 379/445 |
| 2226215 | 6/1990 | United Kingdom | 379/445 |

*Primary Examiner*—Lloyd A. Gall

[57] ABSTRACT

A telephone lock box for preventing unauthorized access to a telephone. The telephone lock box includes a housing that has front and back sides, a pair of lateral sides, and a closed bottom. The sides define an interior of the housing that receives the telephone. An opening into the interior is defined by upper edges of the sides. A lid closes the opening of the housing. A rear end of the lid is pivotally coupled to the back wall of the housing. A forward end of the lid has a hasp coupled to it. The front side of the housing has a loop extending from it. A hinged portion of the hasp has a slot that receives the loop.

12 Claims, 2 Drawing Sheets

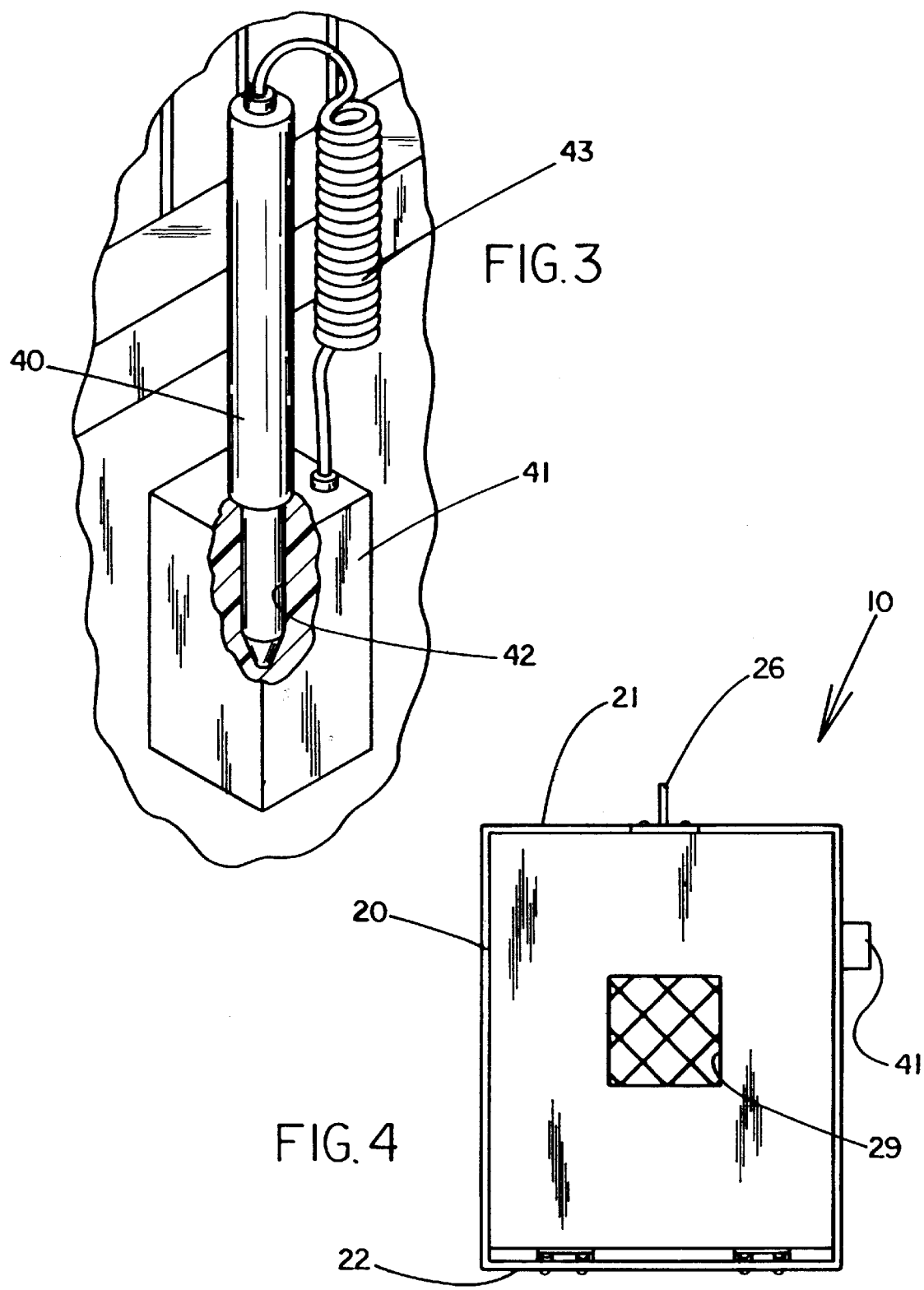

TELEPHONE LOCK BOX

BACKGROUND OF THE INVENTION

1. Field of the Invention

The present invention relates to lock boxes and more particularly pertains to a new telephone lock box for preventing unauthorized access to a telephone.

2. Description of the Prior Art

The use of lock boxes is known in the prior art. More specifically, lock boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,937,860; 3,495,050; 4,005,279; 3,899,647; 4,959,858; and 2,928,909.

While these devices fulfill their respective, particular objectives and requirements, the aforementioned patents do not disclose a new telephone lock box. The inventive device includes a housing that has front and back sides, a pair of lateral sides, and a closed bottom. The sides define an interior of the housing that receives the telephone. An opening into the interior is defined by upper edges of the sides. A lid closes the opening of the housing. A rear end of the lid is pivotally coupled to the back wall of the housing. A forward end of the lid has a hasp coupled to it. The front side of the housing has a loop extending from it. A hinged portion of the hasp has a slot that receives the loop.

In these respects, the telephone lock box according to the present invention substantially departs from the conventional concepts and designs of the prior art, and in so doing provides an apparatus primarily developed for the purpose of preventing unauthorized access to a telephone.

SUMMARY OF THE INVENTION

In view of the foregoing disadvantages inherent in the known types of lock boxes now present in the prior art, the present invention provides a new telephone lock box construction wherein the same can be utilized for preventing unauthorized access to a telephone.

The general purpose of the present invention, which will be described subsequently in greater detail, is to provide a new telephone lock box apparatus and method which has many of the advantages of the lock boxes mentioned heretofore and many novel features that result in a new telephone lock box which is not anticipated, rendered obvious, suggested, or even implied by any of the prior art lock boxes, either alone or in any combination thereof.

To attain this, the present invention generally comprises a housing that has front and back sides, a pair of lateral sides, and a closed bottom. The sides define an interior of the housing that receives the telephone. An opening into the interior is defined by upper edges of the sides. A lid closes the opening of the housing. A rear end of the lid is pivotally coupled to the back wall of the housing. A forward end of the lid has a hasp coupled to it. The front side of the housing has a loop extending from it. A hinged portion of the hasp has a slot that receives the loop.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone lock box apparatus and method which has many of the advantages of the lock boxes mentioned heretofore and many novel features that result in a new telephone lock box which is not anticipated, rendered obvious, suggested, or even implied by any of the prior art lock boxes, either alone or in any combination thereof.

It is another object of the present invention to provide a new telephone lock box which may be easily and efficiently manufactured and marketed.

It is a further object of the present invention to provide a new telephone lock box which is of a durable and reliable construction.

An even further object of the present invention is to provide a new telephone lock box which is susceptible of a low cost of manufacture with regard to both materials and labor, and which accordingly is then susceptible of low prices of sale to the consuming public, thereby making such telephone lock box economically available to the buying public.

Still yet another object of the present invention is to provide a new telephone lock box which provides in the apparatuses and methods of the prior art some of the advantages thereof, while simultaneously overcoming some of the disadvantages normally associated therewith.

Still another object of the present invention is to provide a new telephone lock box for preventing unauthorized access to a telephone.

Yet another object of the present invention is to provide a new telephone lock box which includes a housing that has front and back sides, a pair of lateral sides, and a closed bottom. The sides define an interior of the housing that receives the telephone. An opening into the interior is defined by upper edges of the sides. A lid closes the opening of the housing. A rear end of the lid is pivotally coupled to the back wall of the housing. A forward end of the lid has a hasp coupled to it. The front side of the housing has a loop extending from it. A hinged portion of the hasp has a slot that receives the loop.

Still yet another object of the present invention is to provide a new telephone lock box that prevents children from picking up the phone and randomly dialing numbers.

Even still another object of the present invention is to provide a new telephone lock box that includes a dialing pointer for emergency dialing through the mesh portion of the lid of the lock box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic detailed view of the present invention.

FIG. 4 is a schematic side view of the present invention.

DESCRIPTION OF THE PREFERRED EMBODIMENT

Figure 1:
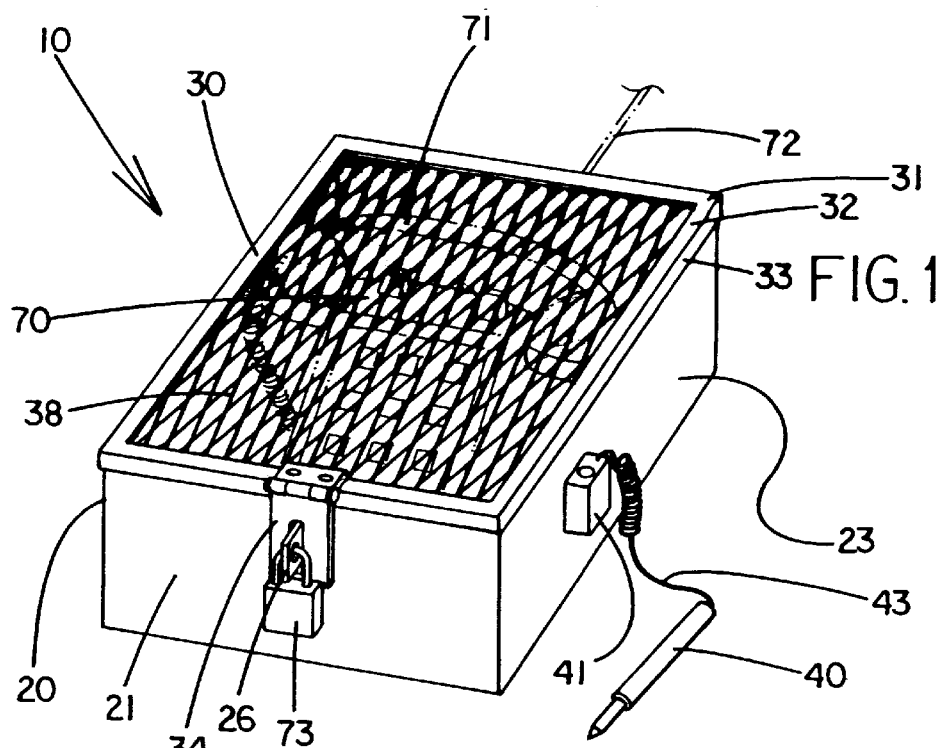
FIG. 1 is a schematic perspective view of a new telephone lock box according to the present invention.
Figure 2:
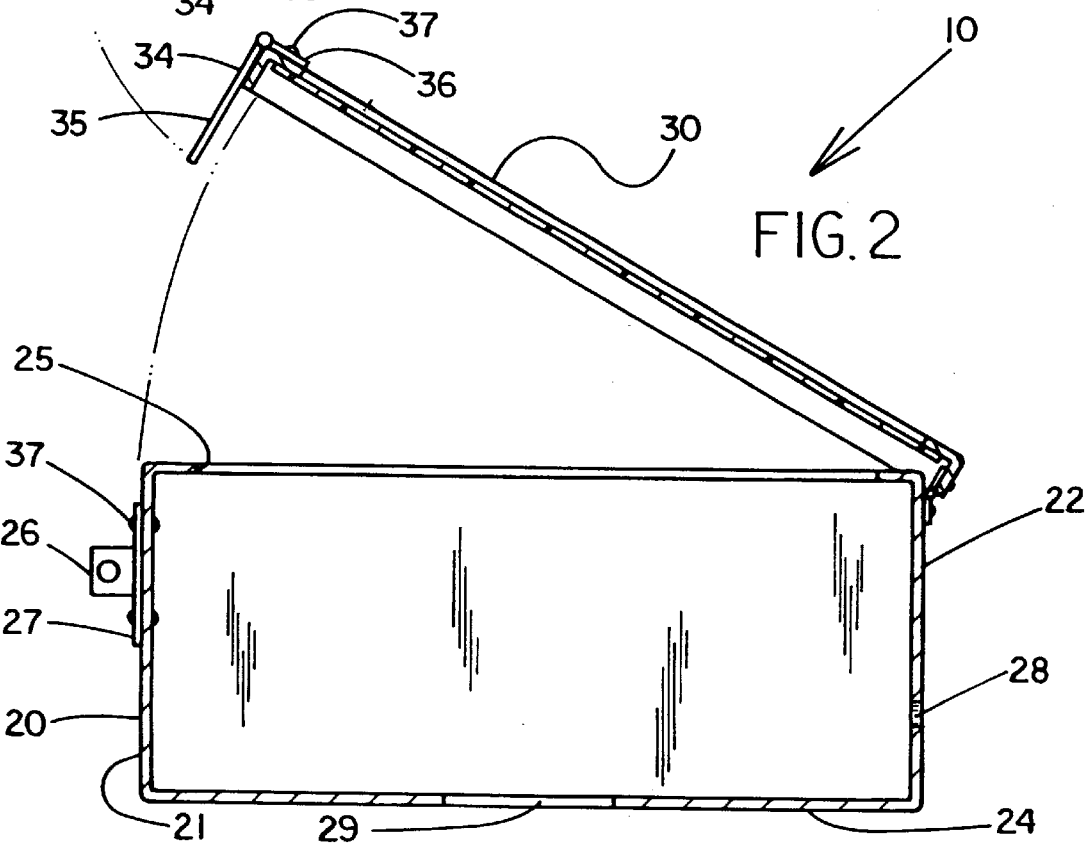
FIG. 2 is a schematic cross-sectional view of the present invention.

With reference now to the drawings, and in particular to FIGS. 1 through 4 thereof, a new telephone lock box embodying the principles and concepts of the present invention and generally designated by the reference numeral 10 will be described.

As best illustrated in FIGS. 1 through 4, the telephone lock box 10 generally comprises a housing 20 that has front and back sides 21,22, a pair of lateral sides 23, and a closed bottom 24. The sides define an interior of the housing 20 that receives the telephone 70. An opening into the interior is defined by upper edges of the sides. A lid 30 closes the opening of the housing 20. A rear end of the lid 30 is pivotally coupled to the back wall of the housing 20. A forward end of the lid 30 has a hasp 34 coupled to it. The front side 21 of the housing 20 has a loop 26 extending from it. A hinged portion 35 of the hasp 34 has a slot that receives the loop 26.

Preferably, the bottom 24 of the housing 20 is generally rectangular such that the housing 20 has a generally rectangular transverse cross section. The lid 30 is generally rectangular. The rear end of the lid 30 is pivotally coupled to the back wall of the housing 20. Ideally, the lid 30 has a mesh portion 38 and a peripheral edge portion 31 that extends around an outer edge of the mesh portion 38.

Also preferably, the peripheral edge portion 31 of the lid 30 has a generally L-shaped transverse cross-section. A horizontal portion 32 of the peripheral edge portion 31 extends across an upper edge of the sides of the housing 20 when the lid 30 is in a closed orientation. The mesh portion 38 is coupled to a lower surface of the horizontal portion 32. A vertical portion 33 of the peripheral edge portion 31 extends downwardly from the horizontal portion 32 and along outer surfaces of the sides of the housing 20 when the lid 30 is in a closed orientation. This design helps prevent insertion of objects between the lid 30 and housing 20 to pry the lid 30 from the housing 20. Ideally, the mesh portion 38 comprises expanded metal.

Preferably, the housing 20 has a peripheral lip 25 extending inwardly of the upper edges of the sides of the housing 20. The mesh portion 38 is squeezed between the lip portion of the housing 20 and the horizontal portion 32 of the lid 30 when the lid 30 is closed and locked to help prevent forceful disattachment of the mesh portion 38 from the horizontal portion 32 of the lid 30 such as by exerting pressure on the mesh portion 38 or striking it.

Also preferably, the hasp 34 is coupled to a forward end of the lid 30. The loop 26 extends from the front side 21 of the housing 20. Ideally, a padlock 73 extends through the loop 26 for securing the hasp 34 to the loop 26.

Preferably, the hasp 34 has a coupling portion 36 that is pivotally coupled to the hinged portion 35 of the hasp 34. A pair of rivets 37 fixedly couple the coupling portion 36 of the hasp 34 to the lid 30. The loop 26 has an abutting portion 27. A plurality of rivets 37 fixedly couple the abutting portion 27 to the front side 21 of the housing 20. Ideally, four rivets 37 couple the abutting portion 27 to the front side 21 of the housing 20, each rivet being positioned towards a corner of the abutting portion 27. Rivets 37 are preferred because they are not as easily detached as threaded fasteners, though they could be used.

Also preferably, the back side 22 of the housing 20 has a wire aperture 28 extending through it that receives phone wires 72 through it. The bottom 24 of the housing 20 has a generally rectangular cutout 29 extending through it that is adapted to provide access to a lower side of a telephone 70 to access various controls of the telephone 70 such as a volume control (not shown) or ringer switch (not shown).

Preferably, a dialing pointer 40 is provided. The dialing pointer 40 may be inserted through apertures of the mesh portion 38 of the lid 30 to dial the telephone 70 in an emergency. The handset 71 is pushed off the hook and a telephone 70 number such as 911 is dialed.

More preferably, a pointer holder 41 is coupled to the housing 20 and has a bore 42 extending therein for receiving a tip of the dialing pointer 40. Ideally, a flexible cord 43 couples the dialing pointer 40 to the pointer holder 41.

A height of the housing 20 is defined between the upper edges of the sides and a lower surface of the bottom 24. The preferred height of the housing 20 is between about 3 inches and 8 inches, ideally about 4 inches. The height should be sufficient to permit the handset 71 of the telephone 70 to be knocked off of the hook with the dialing pointer 40 when the lid 30 is closed so that an emergency call can be placed.

A length of the housing 20 is defined between the front and back sides 21,22. The preferred length of the housing 20 is between about 3 inches and 12 inches, ideally about 7 inches. A width of the housing 20 is defined between the lateral sides 23. The preferred width of the housing 20 is between about 3 inches and 15 inches, ideally about 12 inches.

Preferably, the mesh portion 38 has a plurality of diamond shaped apertures extending therethrough. In such an embodiment, a length of each of the diamond shaped apertures is defined between front and back tips of the apertures. The preferred length of each of the diamond shaped apertures is between about 1 and 3 inches, ideally about 2 inches. A width of each of the diamond shaped apertures is defined between lateral tips of the apertures. The preferred width of each of the diamond shaped apertures is between about ½ and 1½ inches, ideally about 1 inch. The diamond shaped apertures should be large enough to permit insertion and at least slight pivoting of the dialing pointer 40.

A length of the dialing pointer 40 is defined between opposite ends thereof. The preferred length of the dialing pointer 40 is between about 3 and 12 inches.

In use, a telephone 70 is placed in the interior of the housing 20. The lid 30 is closed and the padlock 73 sealed to help prevent unauthorized access to the telephone 70. When a call is to be placed, the padlock 73 is removed and the lid 30 is opened to permit access to the telephone 70. In an emergency, when the lid 30 is locked in a closed position, the dialing pointer 40 is used to push the handset 71 of the telephone 70 off of the hook and a telephone 70 number is dialed. This method of calling and conversing, while adequate for an emergency, would be too uncomfortable to use to make an ordinary call. Most difficult would be the attempt to hear the handset speaker through the mesh portion 38. However, an emergency call could be effective if one could say the vital information into the telephone 70, even without hearing the response.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking box for preventing unauthorized access to a telephone disposed in said locking box, said system comprising:

a housing having front and back sides, a pair of lateral sides, and a closed bottom, said sides defining an interior of said housing, an opening into said interior being defined by upper edges of said sides;

a lid for closing said opening of said housing, said lid being pivotally coupled to said housing; and said lid having a hasp coupled thereto, said housing having a loop extending therefrom, a hinged portion of said hasp having a slot therethrough for receiving said loop therethrough;

wherein said lid has a mesh portion and a peripheral edge portion extending around an outer edge of said mesh portion;

a dialing pointer for inserting through apertures of said mesh portion of said lid for dialing the telephone; and a pointer holder being coupled to said housing and having a bore extending therein for receiving a tip of said dialing pointer, a flexible cord coupling said dialing pointer to said pointer holder, wherein said pointer holder is coupled to an exterior surface of one said lateral sides such that said pointer is accessible when said lid is in a closed position.

2. The locking box of claim 1, wherein said lid further comprises a peripheral edge portion, said peripheral edge portion having a generally L-shaped transverse cross-section, a horizontal portion of said peripheral edge portion extending across an upper edge of said sides of said housing when said lid is in a closed orientation, a vertical portion of said peripheral edge portion extending downwardly from said horizontal portion and along outer surfaces of said sides of said housing when said lid is in a closed orientation.

3. The locking box of claim 1, wherein said peripheral edge portion of said lid has a generally L-shaped transverse cross-section, a horizontal portion of said peripheral edge portion extending across an upper edge of said sides of said housing when said lid is in a closed orientation, said mesh portion being coupled to a lower surface of said horizontal portion, said housing having a peripheral lip extending inwardly of upper edges of said sides of said housing, said mesh portion being squeezed between said lip portion of said housing and said horizontal portion of said lid when said lid is closed for helping prevent forceful disattachment of said mesh portion from said horizontal portion of said lid.

4. The locking box of claim 1, wherein said hasp has a coupling portion being pivotally coupled to said hinged portion of said hasp, a pair of rivets fixedly coupling said coupling portion of said hasp to said lid, said loop having an abutting portion, a plurality of rivets fixedly coupling said abutting portion to said housing.

5. The locking box of claim 1, wherein said bottom of said housing has a generally rectangular cutout extending therethrough and adapted for providing access to a lower side of a telephone.

6. The locking box of claim 1, wherein a height of said housing is defined between said upper edges of said sides and a lower surface of said bottom, said height of said housing being between about 3 inches and 8 inches.

7. The locking box of claim 1, wherein a length of said housing is defined between said front and back sides, said length of said housing being between about 3 inches and 12 inches.

8. The locking box of claim 1, wherein a width of said housing is defined between said lateral sides, said width of said housing being between about 3 inches and 15 inches.

9. The locking box of claim 1, wherein said mesh portion comprises expanded metal.

10. The locking box of claim 1, wherein said mesh portion has a plurality of diamond shaped apertures extending therethrough, a length of each of said diamond shaped apertures being defined between front and back tips of said apertures, said length of each of said diamond shaped apertures being between about 1 and 3 inches, a width of each of said diamond shaped apertures being defined between lateral tips of said apertures, said width of each of said diamond shaped apertures being between about ½ and 1½ inches.

11. The locking box of claim 1, wherein a length of said dialing pointer is defined between opposite ends thereof, said length of said dialing pointer being between about 3 and 12 inches.

12. A locking box and telephone system for preventing unauthorized access to said telephone disposed in said locking box, said system comprising:

a housing having front and back sides, a pair of lateral sides, and a closed bottom, said sides defining an interior of said housing, an opening into said interior being defined by upper edges of said sides;

a telephone being disposed in said interior of said housing;

a generally rectangular lid for closing said opening of said housing, a rear end of said lid being pivotally coupled to said back side of said housing, said lid having a mesh portion and a peripheral edge portion extending around an outer edge of said mesh portion;

said peripheral edge portion of said lid having a generally L-shaped transverse cross-section, a horizontal portion of said peripheral edge portion extending across an upper edge of said sides of said housing when said lid is in a closed orientation, said mesh portion being coupled to a lower surface of said horizontal portion, a vertical portion of said peripheral edge portion extending downwardly from said horizontal portion and along outer surfaces of said sides of said housing when said lid is in a closed orientation;

said housing having a peripheral lip extending inwardly of upper edges of said sides of said housing, said mesh portion being squeezed between said lip of said housing and said horizontal portion of said lid when said lid is closed for helping prevent forceful disattachment of said mesh portion from said horizontal portion of said lid;

a forward end of said lid having a hasp coupled thereto, said front side of said housing having a loop extending therefrom, a hinged portion of said hasp having a slot therethrough for receiving said loop therethrough;

a padlock extending through said loop, said padlock being for securing said hasp to said loop;

wherein said hasp has a coupling portion being pivotally coupled to said hinged portion of said hasp, a pair of rivets fixedly coupling said coupling portion of said hasp to said lid;

wherein said loop has an abutting portion, a plurality of rivets fixedly coupling said abutting portion to said front side of said housing;

said back side of said housing having a wire aperture therethrough adapted for receiving phone wires therethrough;

said bottom of said housing having a generally rectangular cutout extending therethrough and adapted for providing access to a lower side of a telephone;

a dialing pointer for inserting through apertures of said mesh portion of said lid for dialing said telephone;

a pointer holder being coupled to said housing and having a bore extending therein for receiving a tip of said dialing pointer, a flexible cord coupling said dialing pointer to said pointer holder;

said housing having a generally rectangular transverse cross section;

wherein a height of said housing is defined between said upper edges of said sides and a lower surface of said bottom, said height of said housing being about 4 inches;

wherein a length of said housing is defined between said front and back sides, said length of said housing being about 7 inches;

wherein a width of said housing is defined between said lateral sides, said width of said housing being about 12 inches;

wherein said mesh portion comprises expanded metal;

wherein said mesh portion has a plurality of diamond shaped apertures extending therethrough, a length of each of said diamond shaped apertures being defined between front and back tips of said apertures, said length of each of said diamond shaped apertures being about 2 inches, a width of each of said diamond shaped apertures being defined between lateral tips of said apertures, said width of each of said diamond shaped apertures being about 1 inch; and wherein a length of said dialing pointer is defined between opposite ends thereof, said length of said dialing pointer being between about 3 and 12 inches.

\* \* \* \* \*